US 12,015,966 B2

(12) United States Patent
Gao et al.

(10) Patent No.: US 12,015,966 B2
(45) Date of Patent: Jun. 18, 2024

(54) METHOD AND APPARATUS FOR SENSOR SELECTION FOR LOCALIZATION AND TRACKING

(71) Applicant: Nokia Solutions and Networks Oy, Espoo (FI)

(72) Inventors: Fei Gao, Shanghai (CN); Chaojun Xu, Shanghai (CN); Gang Shen, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 338 days.

(21) Appl. No.: 17/760,540

(22) PCT Filed: Sep. 25, 2019

(86) PCT No.: PCT/CN2019/107767
§ 371 (c)(1),
(2) Date: Mar. 15, 2022

(87) PCT Pub. No.: WO2021/056246
PCT Pub. Date: Apr. 1, 2021

(65) Prior Publication Data
US 2022/0360944 A1    Nov. 10, 2022

(51) Int. Cl.
*H04W 4/029* (2018.01)
*G01S 5/02* (2010.01)
(Continued)

(52) U.S. Cl.
CPC ........... *H04W 4/029* (2018.02); *G01S 5/0205* (2013.01); *G01S 5/04* (2013.01); *G01S 2205/02* (2020.05); *H04W 4/33* (2018.02)

(58) Field of Classification Search
CPC ....... H04W 24/10; H04W 4/023; H04W 4/33; H04W 64/00; H04W 64/003;
(Continued)

(56) References Cited

U.S. PATENT DOCUMENTS

2002/0094824 A1 * 7/2002 Kennedy, Jr. ......... H04W 64/00
455/456.5
2011/0269479 A1   11/2011 Ledlie
(Continued)

FOREIGN PATENT DOCUMENTS

CN        1668936 A  *  9/2005  ........... G01S 5/0242
CN      102984745 A  *  3/2013
(Continued)

OTHER PUBLICATIONS

Isler et al., "The sensor selection problem for bounded uncertainty sensing models", Fourth International Symposium on Information Processing in Sensor Networks, Apr. 15, 2005, pp. 151-158.
(Continued)

*Primary Examiner* — Matthew C Sams
(74) *Attorney, Agent, or Firm* — Nokia Technologies Oy

(57) ABSTRACT

Methods and apparatus for sensor selection for localization and tracking are provided. A method (300) performed at an access point (101, 101a, 101b, 101c, 901, 902, 903) comprises: determining, a detectability of the access point (101, 101a, 101b, 101c, 901, 902, 903) for localization for a target device (102), based on channel state information of a radio link between the target device (102) and the access point (101, 101a, 101b, 101c, 901, 902, 903) (302); and determining whether the access point (101, 101a, 101b, 101c, 901, 902, 903) is to be used for position estimation of the target device (102) or not based on the detectability (304). A localization server (103) may further eliminate access points (101, 101a, 101b, 101c, 901, 902, 903) at poor positions from position estimation, by using a predefined weighted-kernel approach.

15 Claims, 12 Drawing Sheets

(51) Int. Cl.
*G01S 5/04* (2006.01)
*H04W 4/33* (2018.01)

(58) Field of Classification Search
CPC ......... H04W 28/0221; H04W 28/0226; H04W 4/02; H04W 4/029; H04W 48/17; H04W 52/0212; H04W 72/542; H04W 84/12; H04W 88/08; H04W 88/085; G01S 5/0205; G01S 5/02521; G01S 5/04; G01S 2205/02; G01S 5/02213; G01S 5/0278; G01C 21/20; G01C 21/206
See application file for complete search history.

(56) References Cited

U.S. PATENT DOCUMENTS

| | | | |
|---|---|---|---|
| 2012/0021768 A1* | 1/2012 | Rudland | G06N 3/126 455/456.1 |
| 2017/0134899 A1* | 5/2017 | Chan | H04W 64/00 |
| 2017/0356979 A1 | 12/2017 | Georgiou et al. | |
| 2018/0206144 A1* | 7/2018 | Jiang | G01S 5/02213 |
| 2019/0215842 A1* | 7/2019 | Silverman | H04W 72/542 |
| 2022/0360944 A1* | 11/2022 | Gao | G01S 5/0205 |

FOREIGN PATENT DOCUMENTS

| | | | | |
|---|---|---|---|---|
| CN | 105472733 A | | 4/2016 | |
| CN | 108279007 A | * | 7/2018 | ............. G01C 21/20 |
| CN | 108303672 A | * | 7/2018 | ............. G01S 5/021 |
| CN | 108318861 A | | 7/2018 | |
| CN | 108848449 A | | 11/2018 | |
| CN | 109951807 A | | 6/2019 | |
| CN | 110012428 A | | 7/2019 | |
| CN | 110691319 A | * | 1/2020 | ........... G06K 9/6256 |
| CN | 112907690 A | * | 6/2021 | |
| WO | 2009/119183 A1 | | 10/2009 | |
| WO | 2017/070057 A1 | | 4/2017 | |
| WO | 2018/114011 A1 | | 6/2018 | |
| WO | WO-2020209053 A1 | * | 10/2020 | |

OTHER PUBLICATIONS

Rowaihy et al., "A survey of sensor selection schemes in wireless sensor networks", Proceedings Unattended Ground, Sea, and Air Sensor Technologies and Applications IX, 2007, pp. 1-11.

Nasipuri et al., "Nonparametric distributed detector using Wilcoxon statistics", Signal Processing, vol. 57, No. 2, 1997, pp. 139-146.

Gupta et al., "On a stochastic sensor selection algorithm with applications in sensor scheduling and sensor coverage", Automatica, vol. 42, No. 2, Feb. 2006, pp. 1-10.

Wang et al., "Nonparametric decentralized detection and sparse sensor selection via weighted kernel", IEEE Transactions on Signal Processing, vol. 64, No. 2, Jan. 15, 2016, pp. 306-321.

Kushki et al., "Kernel-based Positioning in Wireless Local Area Networks", IEEE Transactions on Mobile Computing, vol. 6, No. 6, Jun. 2007, pp. 689-705.

Khalajmehrabadi et al., "A Joint Indoor WLAN Localization and Outlier Detection Scheme Using Lasso and Elastic-net Optimization Techniques", IEEE Transactions on Mobile Computing, arXiv, Oct. 18, 2016, pp. 1-15.

Robles et al., "3D Fingerprint-based Localization for Wireless Sensor Networks", 7th Workshop on Positioning, Navigation and Communication, Mar. 11-12, 2010, pp. 77-85.

Feng et al., "Received Signal Strength Based Indoor Positioning Using Compressive Sensing", IEEE Transactions on Mobile Computing, 2011, pp. 1-12.

Kornatka, "The weighted kernel density estimation methods for analysing reliability of electricity supply", 17th International Scientific Conference on Electric Power Engineering (EPE), May 16-18, 2016, 4 pages.

Mirowski et al., "Probability kernel regression for WiFi localisation", Journal of Location Based Services, vol. 6, No. 2, Jun. 2012, pp. 1-19.

Imran et al., "A Novel Indoor Positioning System Using Kernel Local Discriminant Analysis in Internet-of-Things", Wireless Communications and Mobile Computing, vol. 2018, 2018, pp. 1-9.

Fang et al., "An Improved Hierarchical WLAN Positioning Method Based on Apriori Knowledge", Electronics, vol. 8, No. 5, 2019, pp. 1-15.

International Search Report and Written Opinion received for corresponding Patent Cooperation Treaty Application No. PCT/CN2019/107767, dated Jun. 23, 2020, 10 pages.

Partial European Search Report received for corresponding European Patent Application No. 19947214.3, dated Aug. 1, 2023, 15 pages.

Extended European Search Report received for corresponding European Patent Application No. 19947214.3, dated Jan. 2, 2024, 15 pages.

* cited by examiner

METHOD AND APPARATUS FOR SENSOR SELECTION FOR LOCALIZATION AND TRACKING

RELATED APPLICATION

This application was originally filed as PCT Application No. PCT/CN2019/107767 on Sep. 25, 2019, each of which is incorporated herein by reference in its entirety.

TECHNICAL FIELD

Embodiments of the present disclosure generally relate to localization, and specifically to methods, apparatus and computer readable storage medium for sensor selection for indoor localization and tracking.

BACKGROUND

Accurate positioning unlocks a new set of possibilities for mobile services. Consumers will benefit from personalized, contextual information and offers, as well as new services such as navigation. It will also create new marketing opportunities, which means the proper services and information can be delivered according to user's current location or future location. Emerging LBSs (Location Based Services) include social networking, people finders, marketing campaigns, asset tracking, etc. Also, accurate localization can have a big impact not only by simplifying people's lives, but for example also by helping firefighters, police, soldiers, and medical personnel to save lives and perform specific tasks.

From this aspect, the In-Location Alliance (ILA), formed by 22 member companies (now ILA had expanded to 95 member companies) has launched to drive innovation and market adoption of high-accuracy indoor positioning and related services.

However, there are multiple difficulties when it comes to achieving high precision indoor localization. Standard approaches including Global Positioning System (GPS) that are used for outdoor localization cannot be easily used due to unreliability and obstacles that are present in indoor environments.

One solution is for a cellular operator to provide a unified continuous localization system, as the communication system. Therefore, Wi-Fi or WLAN based localization service is a desirable way to cover the shopping mall, the airport and other large building like a huge exhibition area.

To improve positioning accuracy, a large number of access points (APs) are usually deployed. Increased number of APs can help in distinguishing more distinct locations. However, how to improve accuracy of indoor localization, and especially, how to select sensor in real time manner for accurate localization have become a difficult problem. It is because that it is challenging to design efficient algorithms that overcome exhaustive search over all possible subsets of sensors for optimizing the performance.

SUMMARY

The present disclosure is going to solve the aforementioned problems by proposing an efficient scheme for sensor selection for accurate localization and tracking, for example, in indoor localization and tracking. Other features and advantages of embodiments of the present disclosure will also be understood from the following description of specific embodiments when read in conjunction with the accompanying drawings, which illustrate, by way of example, the principles of embodiments of the present disclosure.

According to a first aspect of the present disclosure, there is provided a method performed at an access point. The method comprises: determining, a detectability of the access point for localization for a target device, based on channel state information of a radio link between the target device and the access point; and determining whether the access point is to be used for position estimation of the target device or not based on the detectability.

In some embodiments, the detectability comprises a detectability of the access point for localizing the target device in indoor localization and tracking.

In some embodiments, the access point may be determined not to be used for position estimation of the target device, if the detectability is lower than a predetermined threshold.

In some embodiments, determining the detectability may comprise training a deep neural network with a set of channel state information, corresponding estimated angle and ground truth; and predicting the detectability by using the trained deep neural network. In some embodiments, the deep neural network may comprise a convolutional neural network, a long short term memory layer and fully connected layers, wherein the long short term memory layer is coupled between the convolutional neural network and the fully connected layers.

In some embodiments, the method may further comprise: sampling the channel state information of the radio link for a predetermined period.

In some embodiments, the method may further comprise: obtaining information on an adjustment to the radio link. The determining of the detectability may be further based on the information on the adjustment. In some embodiments, the adjustment to the radio link may comprise changes in frequency band and/or power of the radio link.

In some embodiments, the method may further comprise: determining a weight for the access point based on the determined detectability. In some embodiments, the method may further comprise: transmitting the weight to a localization server.

According to a second aspect of the present disclosure, there is provided performed at a localization server. The method comprises: determining weights of at least two access points, wherein a weight of an access point is associated with a detectability of the access point for localization of a target device; constructing respective weighted kernel functions for each of the at least two access points; computing for each of the at least two access points, an inner product of the weight of the respective access point with a weighted kernel function constructed for the respective access point; constructing a estimation error function by using inner product for the at least two access points; determining weight parameters of the respective weighted kernel functions, to optimize the estimation error function with a constrain condition of $L_1$ regularization; and selecting one or more access points to be used for position estimation of the target device from the at least two access points, according to the determined weight parameters.

In some embodiments, the weights may be received from respective access points of at least two access points.

In some embodiments, if the determined weight parameter of the weighted kernel function constructed for an access point is non-zero, the access point may be determined to be used for the position estimation.

In some embodiments, the weighted kernel functions may comprise Gaussian function.

In some embodiments, optimization to the estimation error function is further constrained by a distance range of possible movement of the target device.

In some embodiments, the method may further comprise: receiving channel state information of a radio link between the target device and a particular access point of the at least two access points.

In some embodiments, the method may further comprise: utilizing the received channel state information for estimating the position for the target device.

In some embodiments, the method may further comprise: determining, a detectability of the particular access point for localization for the target device, based on the channel state information; and determining whether the particular access point is to be used for position estimation of the target device or not based on the determined detectability.

In some embodiments, determining the detectability may comprise: training a deep neural network with a set of channel state information, corresponding estimated angle and ground truth; and predicting the detectability by using the trained deep neural network.

In some embodiments, the method may further comprise: receiving information on an adjustment to the radio link between the target device and the particular access point. The determining of the detectability of the particular access point may be further based on the adjustment.

In some embodiments, the method may further comprise: determining a weight for the particular access point based on the determined detectability.

According to a third aspect of the present disclosure, an apparatus comprising: at least one processor; and at least one memory including computer program code, the at least one memory and the computer program code configured, with the at least one processor, to cause the performance of the method according to the first aspect.

According to a fourth aspect of the present disclosure, an apparatus comprising: at least one processor; and at least one memory including computer program code, the at least one memory and the computer program code configured, with the at least one processor, to cause the performance of the method according to the second aspect.

According to a fifth aspect of the present disclosure, there is provided computer readable storage medium, on which instructions are stored, when executed by at least one processor, the instructions cause the at least one processor to perform the method according to the first aspect.

According to a fifth aspect of the present disclosure, there is provided computer readable storage medium, on which instructions are stored, when executed by at least one processor, the instructions cause the at least one processor to perform the method according to the second aspect.

BRIEF DESCRIPTION OF THE DRAWINGS

Some example embodiments will now be described with reference to the accompanying drawings in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Figure 1:
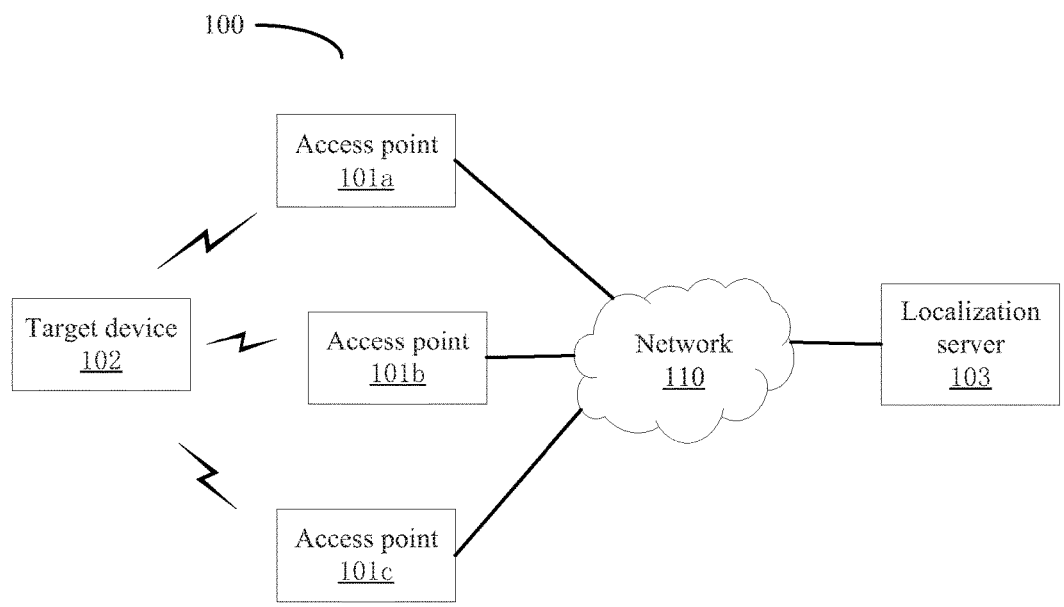
FIG. 1 illustrates an overview of a networked system according to an embodiment of the present disclosure.

FIG. 1 is a block diagram illustrating an overview of a network system according to one embodiment of the present disclosure. Referring to FIG. 1, network configuration 100, e.g. mesh network configuration, includes one or more access points (APs), access nodes or access links 101a-101c (commonly referred to as 101) that can provide one stable wireless communication network or wireless access network, e.g. a wireless local area network (WLAN) (such as Wi-Fi) network, and the like. For example, the access points may be deployed to support a high-speed internet access for the smart campus or large shopping mall. A terminal device 102 may communicate with an access point, via a wireless local area network (WLAN) (such as Wi-Fi) radio, and/or a radio capable of wireless communication. Although there are three access points shown, more access points can be coupled to the localization server 103. Alternatively, the network configuration 100, including the one or more access points (APs) 101a-101c (commonly referred to as 101), can provide wireless local communication network, e.g. Bluetooth® or UWB (ultra-wide band) network, and the like.

The access nodes may be communicatively coupled to a localization server 103 over a network 110. The network 110 may be any type of network, such as a local area network (LAN), a wide area network (WAN) such as the Internet, a cellular network, or a combination thereof, wired or wireless. All of the access point 101 may share the information of terminal device 102 for obtaining channel state information over the network 110. As will be appreciated, by directly or indirectly connecting the APs 101 and the localization server 103, and/or any of a number of other devices, to the network 110, the APs 101 may communicate with one another, the localization server 103, etc., to thereby carry out various functions for localization, such as to transmit data, indication, information or the like to, and/or receive data, indication, information or the like from, each other.

As used herein, the terms "data," "indication," "information" and similar terms may be used interchangeably to refer to data capable of being transmitted, received and/or stored in accordance with embodiments of the present invention. Thus, use of any such terms should not be taken to limit the spirit and scope of embodiments of the present invention.

The access point 101 may be any kind of network devices that may be configured to provide a wireless access to a target device 102 through a radio link, in accordance with techniques such as, for example, radio frequency (RF), infrared (IrDA) or any of a number of different wireless networking techniques, including WLAN techniques, world interoperability for microwave access (WiMAX) techniques, and/or wireless Personal Area Network (WPAN) techniques, BlueTooth (BT), ultra wideband (UWB), wireless cellar communication techniques based on Code Division Multiple Access (CDMA), High Rate Packet Data (HRPD), Universal Terrestrial Radio Access Network (UTRAN), Long-Term Evolution (LTE), LTE-advanced (LTE-A), 5-th generation (5G) cellular systems, and/or the like. It is appreciated that the illustrated embodiment is non-limiting, and that any number of various wireless devices and telecommunication systems may be employed, as readily appreciated to the person skilled in the art. The localization server 103 may be any kind of server, such as Web or cloud server, application server, backend server, edge server, base station, personal computer, target device 102, access point 101, or a combination thereof. The access point 101 and the localization server 103 may be configured to support localization, e.g. indoor localization based on a Wi-Fi platform with AOA (Angle of Arrival) method. The access point 101 may be configured to transmit to the localization server 103, localization-related information of a target. For example, the localization-related information may comprise channel state information of a communication with the target. The localization server 103 may be configured to collect localization-related information of a target (such as the terminal device 102) from the access points 101, and estimate a position of the target. In some embodiments, the localization server may be installed in a same entity with an access point. In some embodiments, the functions of the localization server may be distributed in multiple entities, including access points and servers. The system of FIG. 1 can also be used for outdoor localization, for example, in an IoT (Internet of Things) solution.

From a perspective of localization, the terminal device can also be referred as a target device. It refers to any end device that can access a wireless communication network and receive services therefrom. By way of example and not limitation, the target device may refer to user equipment (UE), or other suitable devices. The UE may be, for example, a subscriber station, a portable subscriber station, a mobile station (MS) or an access terminal (AT), or any combination thereof. The target device may include, but not limited to, a portable computer, an image capture device such as a digital camera, a gaming terminal device, a music storage and playback appliance, a mobile communication device, a mobile phone, a cellular phone, a smart phone, a navigation device, a tablet, a wearable device, a smart watch, a fitness band, a telecare band, a personal digital assistant (PDA), a vehicle, an IoT device, a sensor device, and the like, or any combination thereof.

As mentioned above, in general, sensor selection is a difficult problem, because it is challenging to design efficient algorithms that overcome exhaustive search over all possible subsets of sensors for optimizing the performance . . . .

Figure 2:
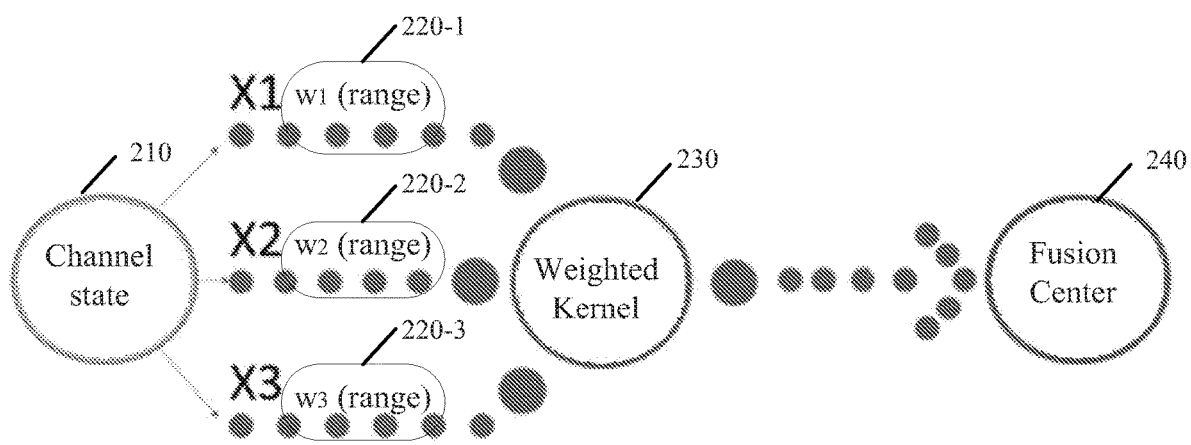
FIG. 2 illustrates a procedure for sensor selection according to an embodiment of the present disclosure.

This disclosure provides a predefined weighted-kernel approach to simplify the sensor selection. FIG. 2 illustrates a procedure for selecting sensors for obtaining a position of a given target according to the present disclosure. A weight range (e.g. represented as $w_1, w_2, w_3$) is assigned to each AP based on detectability of respective AP, as shown at 220-1, 220-2, and 220-3, respectively. The detectability indicates observation quality of an AP with regard to position estimation of the given target. The detectability (e.g. $X_1, X_2, X_3$ for respective APs) of a particular AP can be predicted using machine learning from channel state information 210 of communication channels between the given target and the particular AP. In the machine learning, a map can be created based on detectability of an AP and the probability of the detectability. The AP with detectability below a threshold can be removed. Thus, the effect of an AP with a poor channel state for localization can be mitigated.

Further, as shown at 230, a weighted kernel can be constructed to mitigate the effect of an AP at poor positions. Further, estimation error (which may be based on angular localization) can be introduced as a loss function as well as a LASSO (Least absolute shrinkage and selection operator) regulation to eliminate the APs at poor positions, as shown at 240. An $L_1$ distance constraint may also be added for the loss function.

Figure 3:
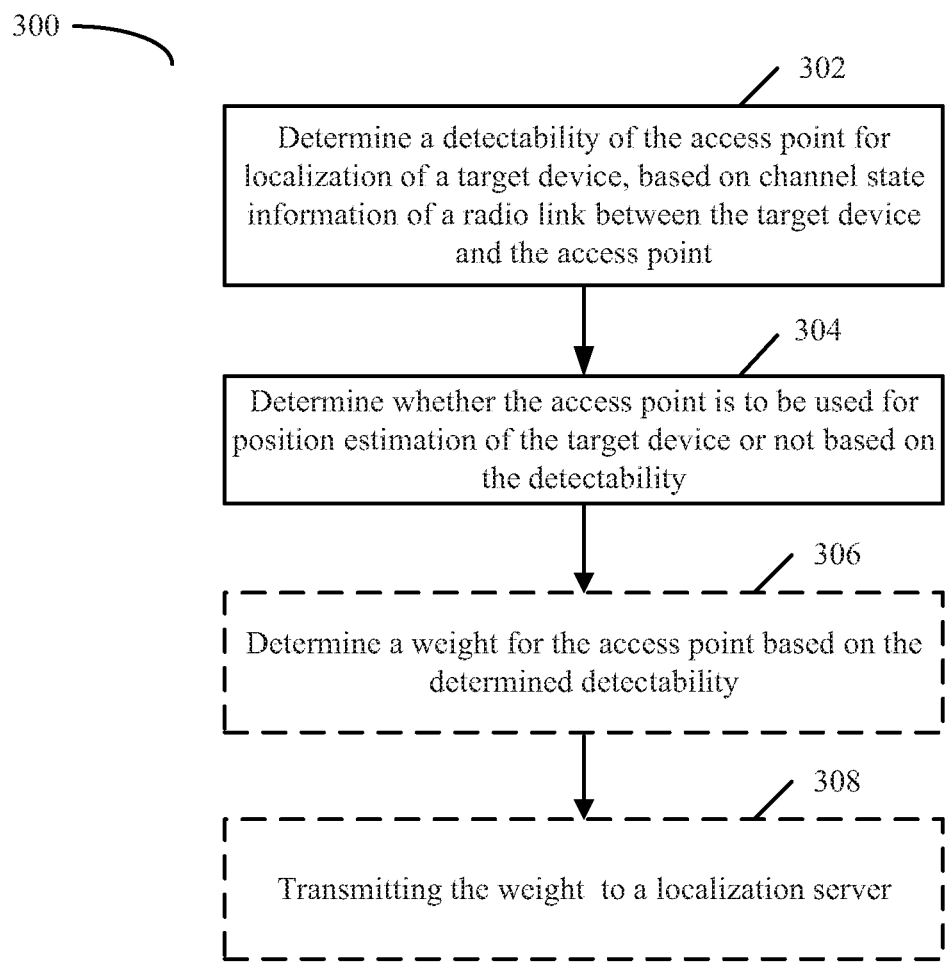
FIG. 3 is a flowchart depicting a procedure for sensor selection according to an embodiment of the present disclosure.

Reference is now made to FIG. 3, which shows a flowchart of a method 300 according to some embodiments of the present disclosure. The method 300 may be implemented at an access point (e.g., a Wi-Fi or WLAN access point, like the APs 101 shown in FIG. 1). As shown in FIG. 3, the method 300 may comprises: determining, a detectability of the access point for localization for a target device, based on channel state information (CSI) data of a radio link between the target device and the access point, at block 302; and determining whether the access point is to be used for position estimation of the target device or not based on the detectability at block 304. If the detectability of an access point is lower than a predetermined threshold, it can be determined that the access point is not to be used for position estimation of the target device. Thus, the effect of an access point with a poor channel state for position estimation in the localization can be mitigated. Consequently, the number of access points in localization, as well as computation complexity, can be significantly reduced. In an alternative solution, the method 300 may determine the detectability of the access point for the indoor localization based on the CSI data and measured received signal strength indicator (RSSI) data and/or received channel power indicator (RCPI) data of the radio link between the target device and the access point.

In some embodiments, the method 300 may further comprise determining, e.g. assigning, a weight for the access point based on the determined detectability, wherein an access point with a higher detectability is assigned a higher weight, at block 306. The weight may be determined in response to a determination that the access point is to be used for the position estimation of the target device. In an example, an access point with low detectability may be assigned a lower weight. Accordingly, an access point with high detectability may be assigned a higher weight.

In some embodiments, the method 300 may further comprise transmitting the weight from the access point to a localization server, at block 308. The channel state information of the radio link may be sampled by the access point for a predetermined period. The channel state information (CSI) is information on the channel property of a radio link. It describes the weakening factors of the signal in each transmission path, such as Scattering, fading, multipath fading or shadowing fading, and power decay of distance. CSI can further reflect an observation quality of an access point for localizing a target accurately.

In some embodiments, the method 300 may further comprise obtaining information on an adjustment to the radio link. The determining of the detectability may be further based on the information on the adjustment. The adjustment may comprise changes in frequency band and/or power of the radio link.

Figure 4:
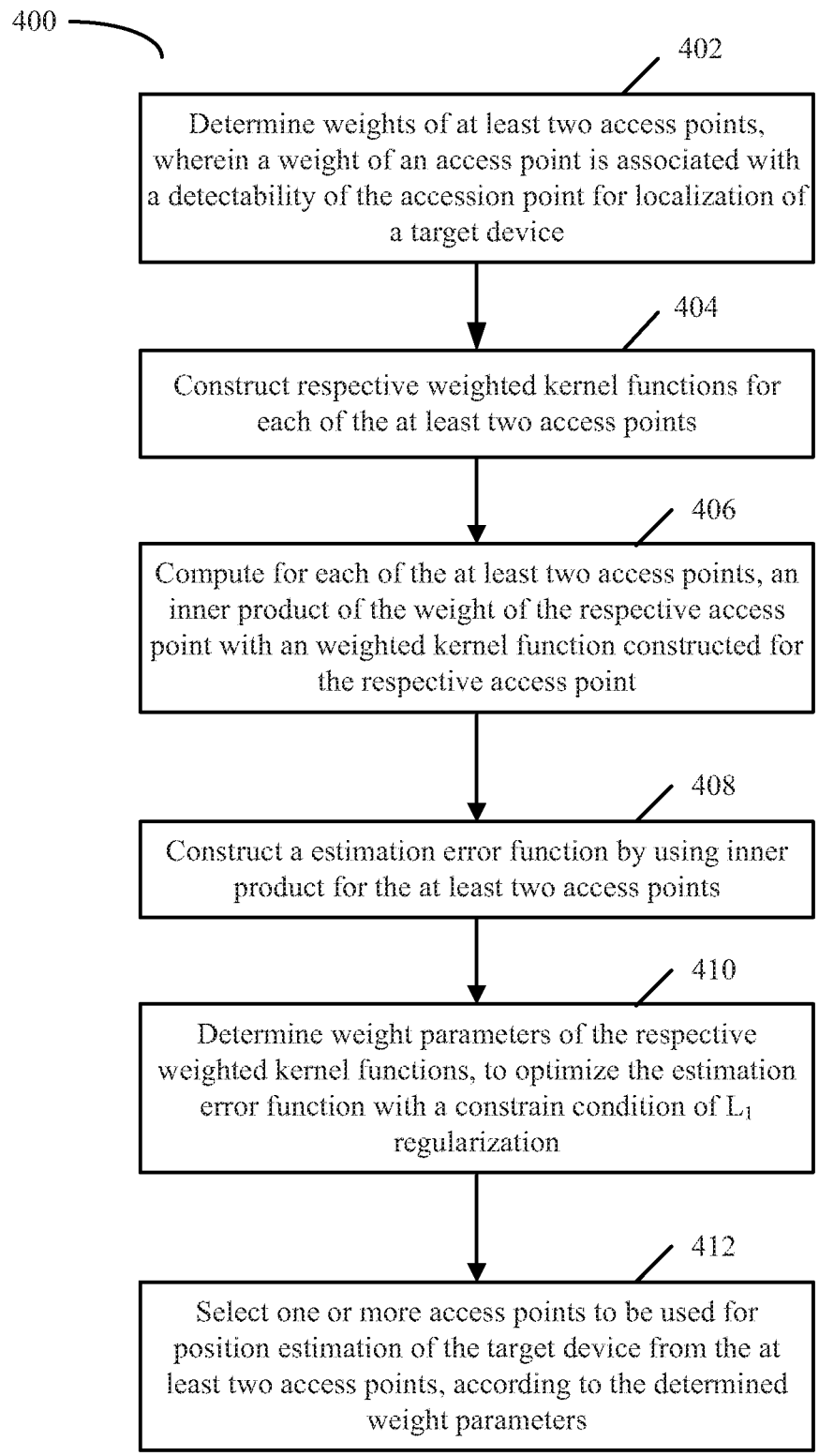
FIG. 4 is another flowchart depicting a procedure for sensor selection according to an embodiment of the present disclosure.

Reference is now made to FIG. 4, which shows a flowchart of a method 400 according to an embodiment of the present disclosure. The method 400 may be implemented at a localization server (e.g. the localization server 103 as shown in FIG. 4). Alternatively, the method 400 may be implemented in the one or more access points 101, in which case, the access points share the determined weights. As shown in FIG. 4, the method 400 may comprises: determining, e.g. obtaining, weights of at least two access points, wherein a weight of an access point is associated with a detectability of the access point for localization of a target device, at block 402; constructing respective weighted kernel functions for each of the at least two access points at block 404; computing for each of the at least two access points, an inner produce of the weight of the respective access point with a weighted kernel function constructed for the respective access point, at block 406; constructing an estimation error function by using inner produces for the at least two access points, at block 408; determining weight parameters of the respective weighted kernel functions, to optimize the estimation error function with a constrain condition of $L_1$ regularization, at block 410; and selecting one or more access points to be used for position estimation of the target device from the at least two access points, according to the determined weight parameters, at block 412.

In some embodiments, the localization server may further utilize received channel state information for determining a detectability of the particular access point, and further for determining whether the particular access point is to be used for localizing the target device or not based on the determined detectability, in a similar manner as that shown at block 302 and 304 in FIG. 3. Furthermore, the localization server may determine a weight of the particular access point based on the determined detectability, in a similar manner as that shown at block 308 in FIG. 3. This may be advantageous for the power efficiency, e.g. in a scenario where the access point has limited computing ability and power. For example, at block 402, the localization server can receive the CSI data, and the other data, such as the RSSI, RCPI and/or the radio link adjustment data, from at least two access points and may determine, e.g. assign, a weight for a respective access point based on determined detectability.

In another alternative, at block 402, the localization server may receive the weights from respective access points of the at least two access points. In this regard, the one or more access points 101 can receive the CSI data, and the other data, such as the RSSI, RCPI and/or the radio link adjustment data, from at the least two access points, and may determine, e.g. assign, a weight for the respective access point based on determined detectability.

In some embodiments, if the determined weight parameter of the weighted kernel function constructed for an access point is non-zero, it can be determined that an access point is to be used for the position estimation. In some embodiments, the determined weight parameter of the weighted kernel function constructed for an access point is close to zero, it can be determined that an access point would not to be used for the position estimation.

In some embodiments, the method 400 may further comprise receiving channel state information of a radio link between the target device and a particular access point of the at least two access points. The received channel state information may be utilized for estimating a position of the target device.

Figure 5B:
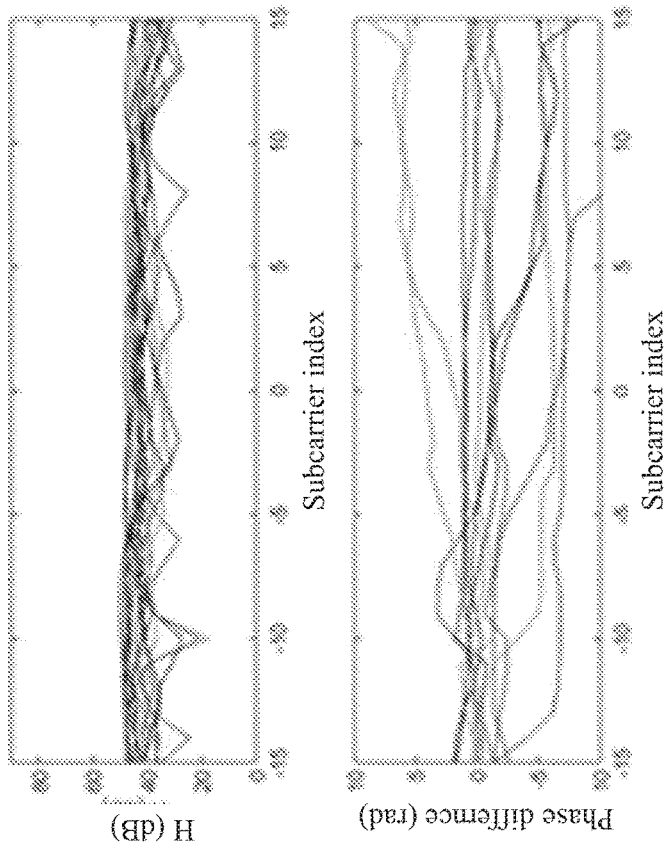
FIG. 5B are diagrams illustrating CSI distributions for a target through obstacle.
Figure 5A:
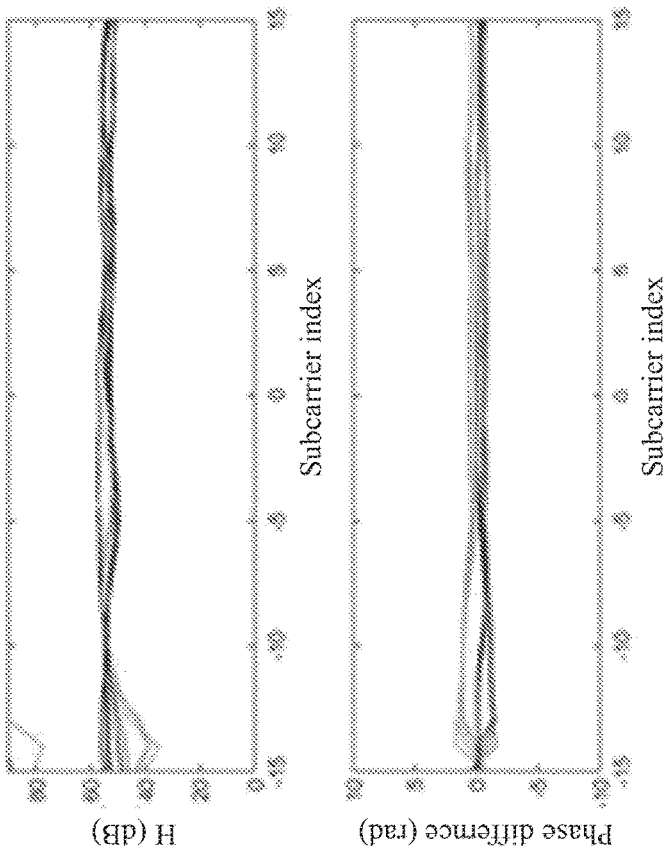
FIG. 5A are diagrams illustrating CSI (Channel State Information) distributions for a target with LOS (Line of Sight) is strong.

The detectability of an access point may be determined through a machine learning technique. FIGS. 5A and 5B illustrates that an obvious difference exists when a Wi-Fi access point can detect a target with various detectability. In practice, people can easily determine from a diagram of CSI distribution and/or related information that an access point to be in high quality or not. For example, it is obvious that the CSI distribution in FIG. 5A is stable, e.g. in subcarrier and phase; and the CSI distribution in FIG. 5B fluctuate drastically. However, the mathematical formulation to judge a sensor's quality is often exhaustive and sensitive to the noise, outliers and dynamic objects.

Figure 6:
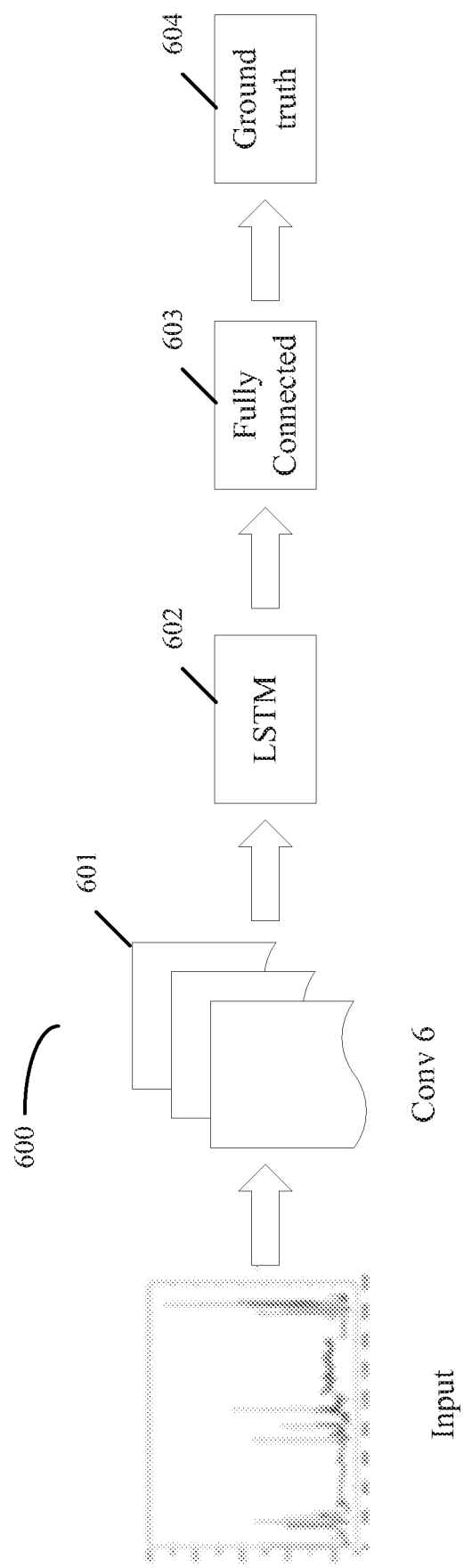
FIG. 6 illustrates a exemplary architecture of a Deep Neural Network for determining detectability from CSI according to embodiments of the present disclosure.

In the past, a sensor's detectability may be determined in statistically way which doesn't work well in practice. A new paradigm based on Deep Neural Network (DNNs) emerges to alleviate the manual tuning problems. By using the DNNs, a higher confidence to remove the very poor sensors based on detectability may be realized in the scheme of the present disclosure. FIG. 6 depicts the proposed DNN architecture 600 which is mainly composed of a feature extractor part and a quality regressor part. The feature extractor part may be Convolutional Neural Networks (CNNs) 601, which are configured to learn from raw channel state information (CSI). Instead from learning from the estimated angle of arrival, the raw CSI is preferable. The regressor part 602 consists of a recurrent network that may comprise a Long Short Term Memory (LSTM) layer 602 and fully connected layers 603. Compared to directly using fully connected layers, the LSTM layer 602 is more suitable to learn the long dependencies over time. It should be appreciated that other DNNs that have an ability of extracting the features and data dependencies can also be used in the determination of detectability.

In a training procedure, the input is raw CSI data, and the output may be an estimated angle. Through a comparison of the estimated angle with ground truth, a map between an observation quality and the raw CSI can be established. Then, the detectability of an access point can be reliably predicated from new CSI, by the trained DNNs network.

With the help of machine learning, a problem of high sensitivity to the noise and outlier caused by manual tuning to parameters in the statistically way can be alleviated. Additionally to the raw CSI data, also the other data, such as the RSSI, RCPI and/or the radio link adjustment data can be used in the training procedure.

Although a machine learning method is proposed to improve the detectability of the AP as a sensor, it is found that this machine learning method may be still computation cost. Existing AP is designed for communication, and it may automatically adjust some parameters of radio links, e.g. when a collision happens. In this situation, a deteriorated CSI may be caused by the adjustment, rather than a poor detectability. In some embodiments, an AP is further configured to report the adjustment of radio links, such as changes in frequency band and/or power of the radio link. The detectability may be determined more accurately based on the adjustment.

A weight (e.g. denoted as $w_i$) may be determined, e.g. assigned, for each AP based on its detectability. The weight is a probability of quantized detectability of an access node. The weight may be given a range in advance. Thus, the complexity of sensor selection can be significantly reduced. For example, the access point with detectability below a defined threshold may be removed.

Figure 7:
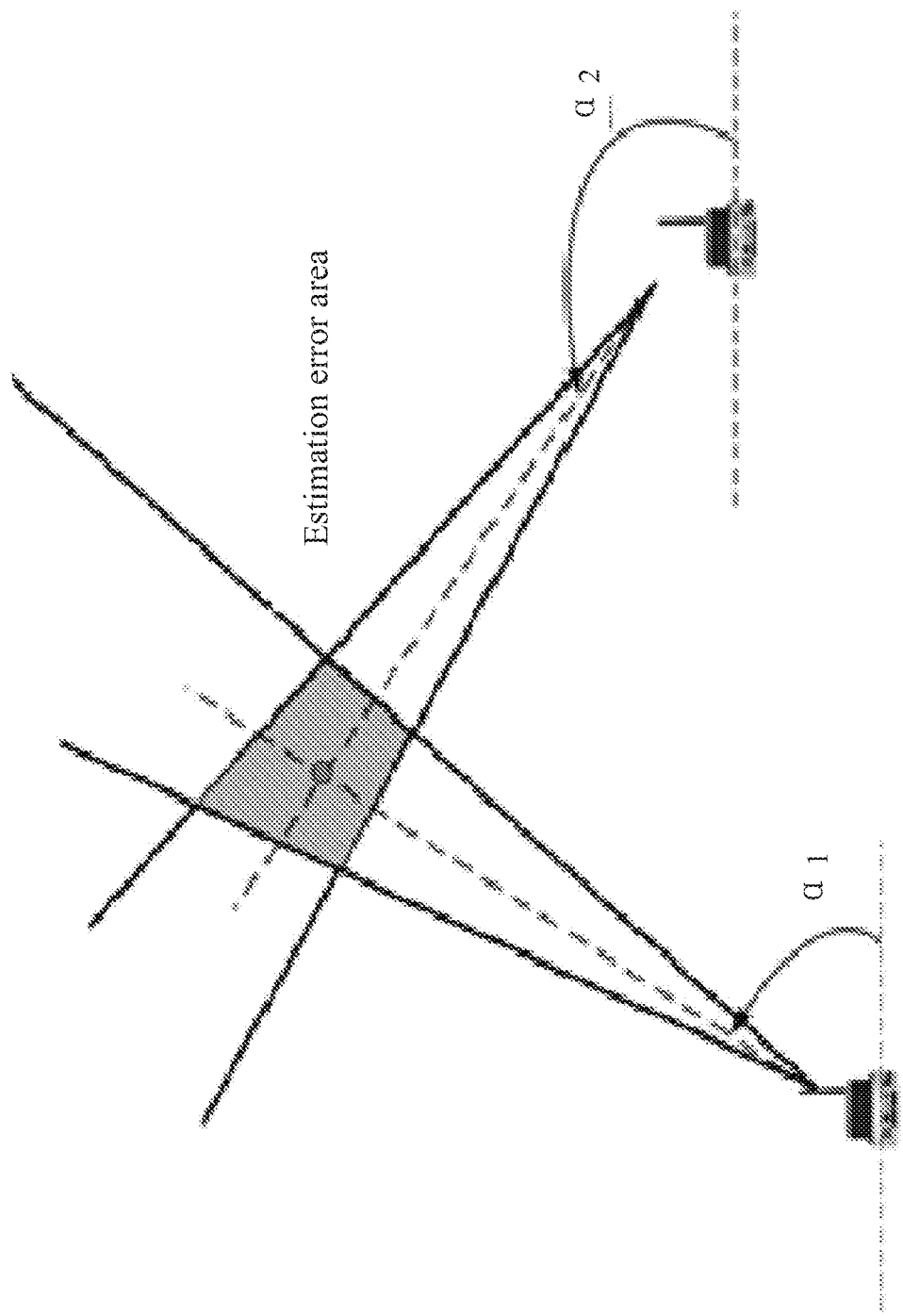
FIG. 7 illustrates an estimation error model based on angular localization.

In the step as shown at block 404, the kernel function can be constructed to mitigate the effect of poor access points based on the detectability, or the corresponding weights. However, it cannot function in selecting access points at a good position. Therefore, an estimation error area is introduced as a loss function as well as a LASSO (Least Absolute Shrinkage and Selection Operator) regulation to eliminate the sensors at poor positions. FIG. 7 presents an estimation error model based on angular localization, in which the shadowed area illustrates an estimation error area. Similar in FIG. 1, the estimation error with best access points leads to the smallest area. The sensor selection problem can be solved by borrowing the machine learning techniques of LASSO, which significantly reduces computational complexity. In this regard, a non-convex optimization problem can be transformed to a linear programming problem, which facilitates the implementation in practice.

Figure 8C:
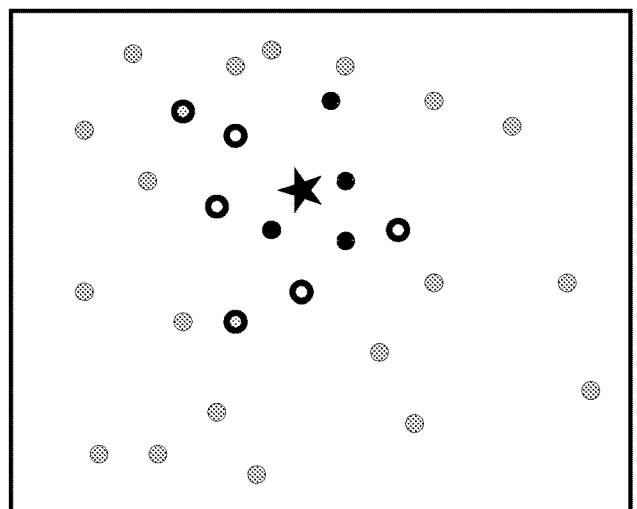
FIGS. 8A-8C illustrate a process of sensor selection according to an embodiment of the present disclosure.
Figure 8B:
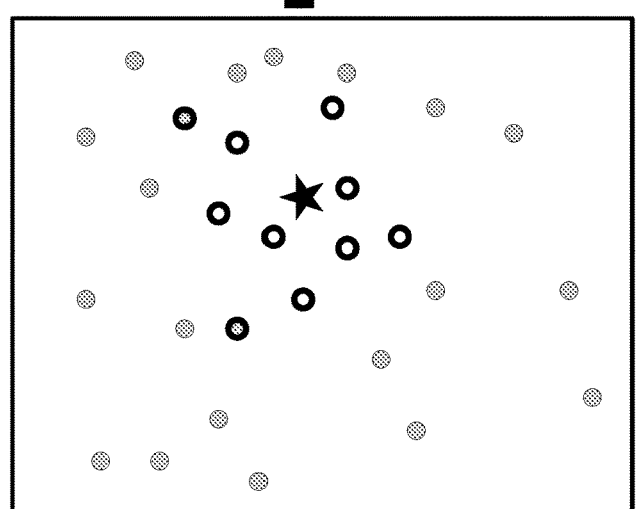
Figure 8A:
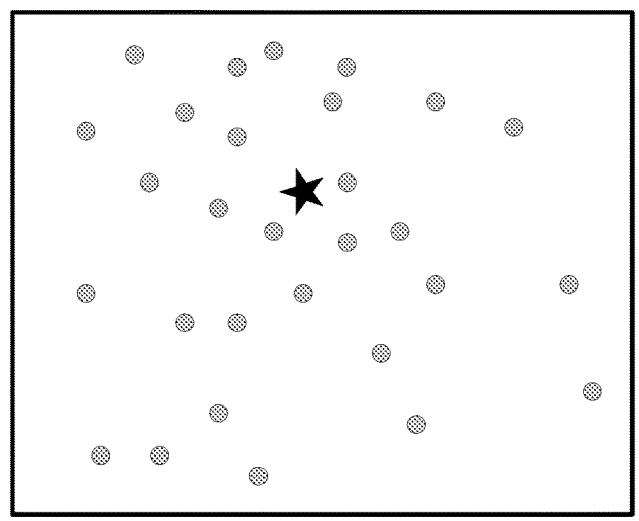

FIGS. 8A-8C show a process of the sensor selection according to an embodiment. As shown in FIG. 8A, a plurality of access points can be taken as candidate sensors (denoted as grey dots) for estimating position of a target device (denoted as a star) at a moment. As shown in FIG. 8B, the sensors with higher detectability are chosen firstly, which are marked in white dots with a bold border. The grey dots with a bold border in FIG. 8B represent sensors with low detectability and/or weights due to poor observation quality, which are still usable. Second, the sensors to be used for estimating position of the target device are selected based on locations of the sensor, which are marked in black dots. Through this process, a sensor selection can be performed with a higher accuracy and minimum power consumption.

Figure 9:
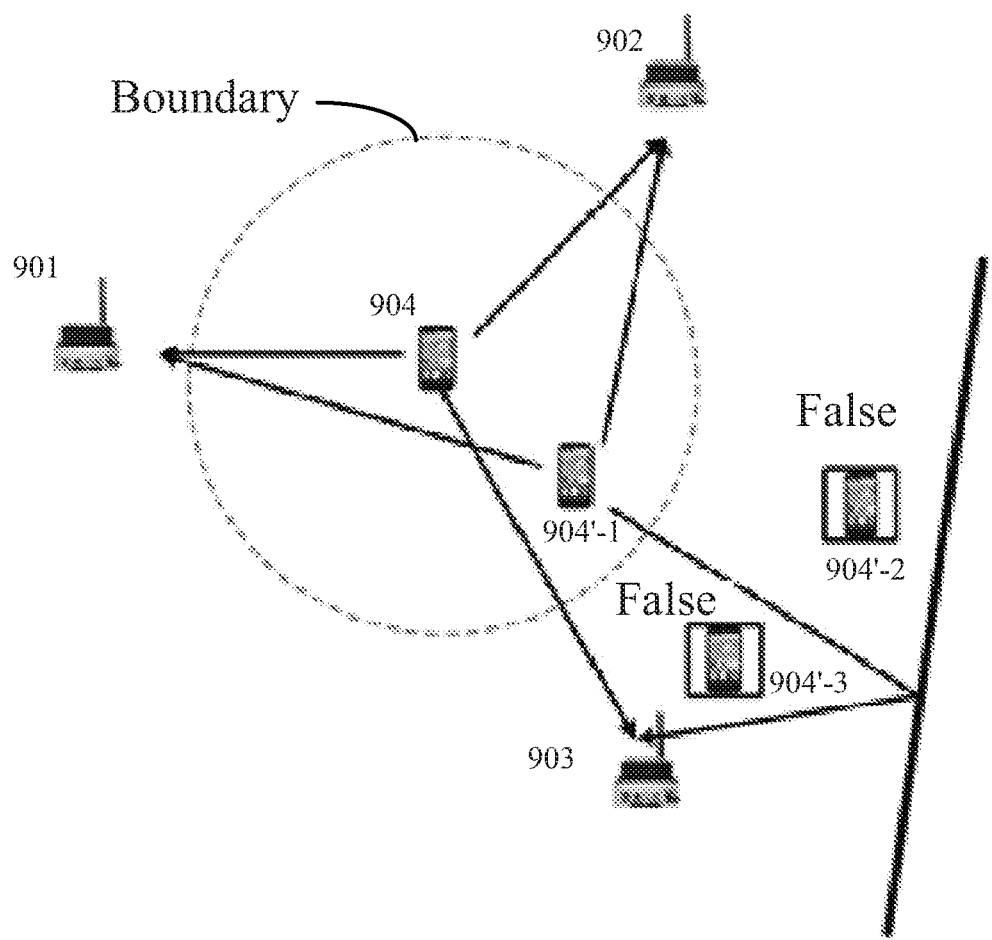
FIG. 9 illustrates a scenario of utilizing a distance constraint for sensor selection.

If other constraints are introduced, they can be introduced to the loss function with a regulation part. For example, a prediction of movement of the target device can lead to a boundary for the sensor selection based on a movement speed of the target device. FIG. 9 illustrates in a mesh network configuration a scenario of utilizing a distance constraint for sensor selection. In a moment, a target device (such as a mobile phone) is localized at 904 via access points 901, 902, and 903. After a while, the target device is to be further localized. According to movement of the target device, a boundary of a possible position of the target device can be determined. Thus, the position beyond the boundary, e.g. as shown as 904'-2 and 904'-3 may be excluded from the estimation error area. In an embodiment, a distance constraint may be added for the loss function, so as to improve an accuracy and power consumption for localization.

Figure 10:
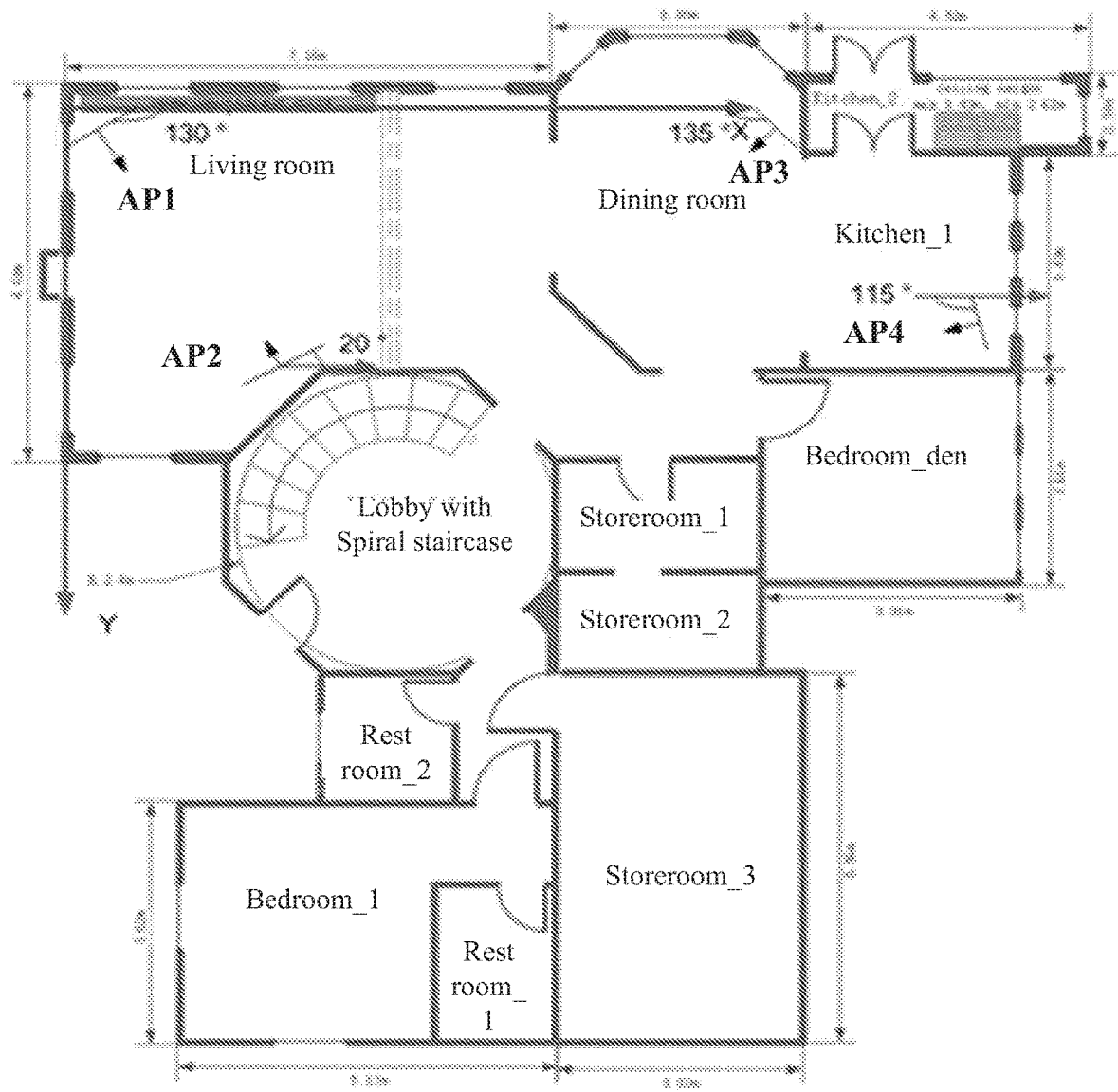
FIG. 10 illustrates exemplary access point distribution and map of a house, where an indoor localization and tracking can be performed.

More detailed embodiments of the solution of this disclosure will be provided as follows, for example, in a mesh network configuration. In an illustrating example, 4 APs are deployed in a large villa for experiment, as shown in FIG. 10 that shows the location and reference direction of the APs. The angle between the $AP_i$ (i=1, 2, 3, or 4) with the x axis is labelled for the angular direction estimation. A target device (102), such as a cell phone, carried by a person is used as a target device to determine the location and tracking in daily life.

The CSI data of a radio link between one or more APs (denoted as $AP_i$) and the cell phone may be obtained from the one or more AP end as sensor data (denoted as $X_i$). Then, the CSI data may be analyzed through machine learning technique, to build a map for the detectability of the $AP_i$ and the probability of the observation quality. The analyzing on the CSI data can be performed at the AP, or at a localization server. Additionally to the CSI data, also the other data, such as the RSSI, RCPI and/or the radio link adjustment data may be analyzed through machine learning technique.

Here, the sensor data $X=\{X_i\}$ is quantized and denoted as $Z=\{z_i\}$, for a decision rule for determining whether an AP is to be used for localizing the cell phone or not based on the detectability. The $z_i$ is used by a quantized value of $X_i$ by $AP_i$. For example, the decision rule can be determined by using a kernel function $k(\cdot)$. The sensors with a low detectability are assigned lower a weight. In an example shown in FIG. 10, the detectability of AP4 is poor, due to the multiple walls between the cell phone and AP4, especially in the lobby. The decision rule utilizing a kernel function can be expressed as:

$$W(Z)=<w_i(\cdot),k(\cdot)>, \qquad (1)$$

where $w_i(\cdot)$ is the weights assigned to the APs, and $<, >$ represent an inter product operation.

The above decision rule according to the equation (1) does not consider the impact of location of APs. It is based on the detectability and observation quality of APs. In order to remove the APs at poor locations for the localization, $L_1$ regularization can be introduced for the kernel weight parameters for sparse sensor selection. More specifically, optimal weight parameters $\beta=\{\beta_i\}$ for all the APs can be determined by minimizing $L_1$ regularized loss function. As described above, the estimation error area is introduced as the loss function. An example function is shown in following:

$$\min \Sigma_{i=1}^{N}=\Phi(<w_i(\cdot),k_{\beta_i}(\cdot)>)+\lambda\|\beta\| \qquad (2)$$

where $\phi(\cdot)$ is an error area function, $k_{\beta_i}(\cdot)$ is a weighted kernel function constructed for an $AP_i$, and $\lambda\|\beta\|$ is a component of $L_1$ regularization. In the above function, L regularization for kernel weight parameters encourages sparse weight selection.

Then, a decision rule for removing the APs at poor locations can be determined based on the optimal weight parameters. For example, if an optimal weight parameter $\beta_i$ is non-zero, it can be determined that the corresponding $AP_i$ can be selected for localization. Otherwise, if an optimal weight parameter $\beta_i$ is zero, it can be determined that the corresponding $AP_i$ can be removed for localization.

In the above embodiments, a Gaussian function $k(x, y)=\exp(-\gamma\|x-y\|^2)$ is taken as the kernel function, because it is a radial basis function. However, it should be noted that, many other types of kernel functions may be utilized in formulating the sensor selection problem as a weight selection problem.

Figure 11:
FIG. 11 illustrates estimation results based on all of the access points.
Figure 12:
FIG. 12 illustrates estimation results based on a sensor selection scheme according to an embodiment of the present disclosure.

FIGS. 11 and 12 illustrates location estimation results (i.e. black dots) in an environment as shown in FIG. 10. Four APs (i.e. AP1-AP4) are deployed in a villa as shown in FIG. 10. A user with a target device 102, e.g. a cell phone walks from the lobby to the living room, and then stops at the dining room. The measurement of received signal, such as CSI data and/or other data, such as information on adjustment of radio links, can be taken on each AP individually. The measured data, i.e. the CSI data, and/or the other data, may be sampled periodically, e.g. per 50 ms. A localization server (such as the localization server 103 in FIG. 1), or one or more APs, collects the measured data from the APs, and makes the decision on sensor selection. The map of the villa can be stored in the localization server, or in the one or more APs. The detectability of each AP may be predicted based on huge CSI data training at first.

FIG. 11 is the estimated location and tracking results based on the measured data from all of the APs all the time. It is found that the estimation error is large, and estimation is missing in some areas due to poor observation and absence of AP selection. The estimation based on the proposed sensor selection scheme is shown in FIG. 12. The results show that AP1 and AP3 are used all the time, while AP2 is active when the cell phone is passing through the living room. AP4 is inactive at any time. Compared with the location results (i.e. the black dots) shown in FIG. 11, FIG. 12 illustrates that the proposed sensor selection scheme can significantly improve the estimation accuracy.

Figure 13:
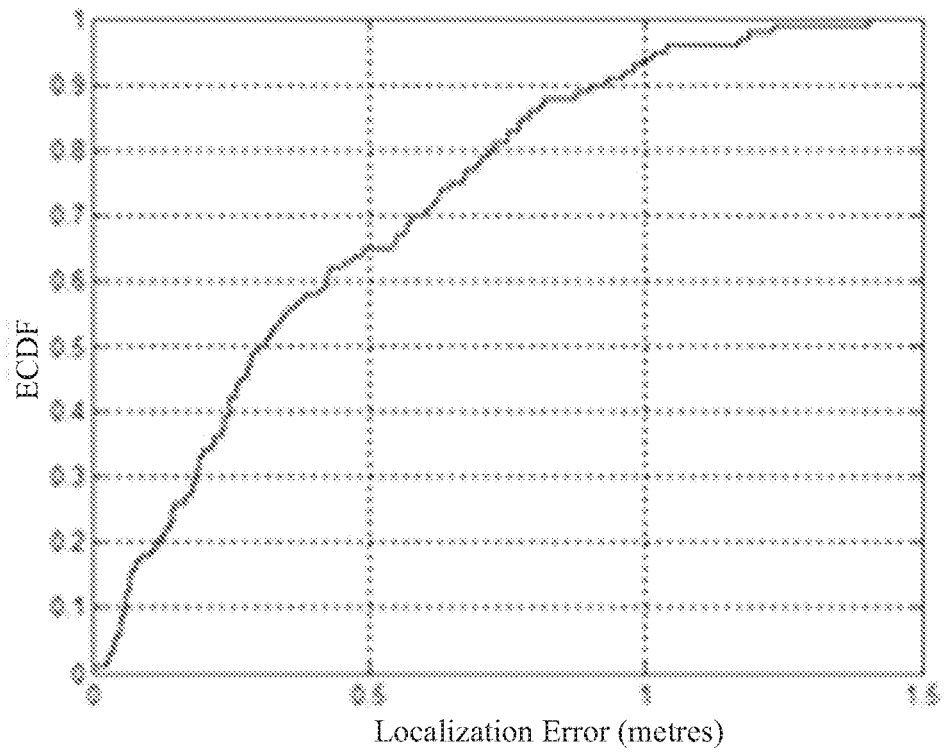
FIG. 13 illustrates a measured cumulative distribution of error for FIG. 12.

FIG. 13 shows the measured cumulative distribution of errors for the result in FIG. 12. There is no quantitative analysis for FIG. 11 due to a large error that shows no localization results in an area. Compared to the results in FIG. 11, FIG. 12 shows a significant improvement in the localization result by using the sensor selection.

Figure 14:
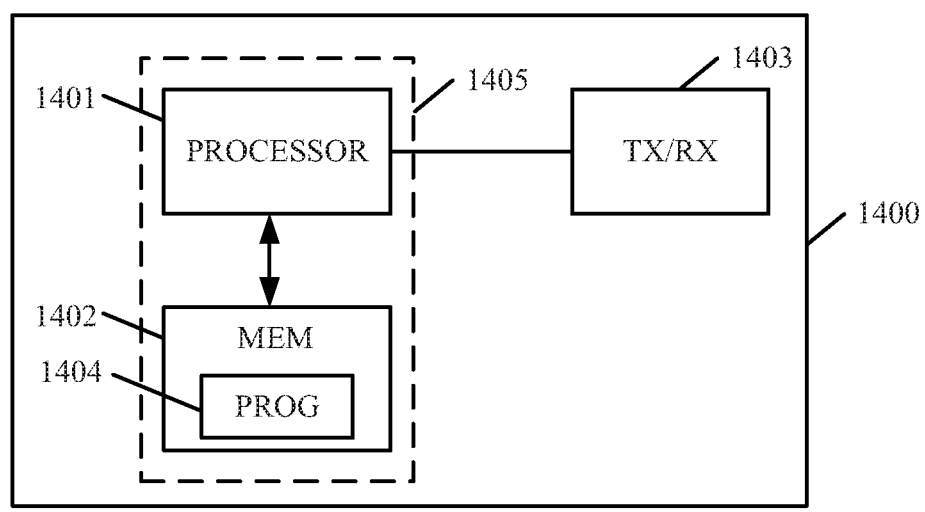
FIG. 14 shows a simplified block diagram of apparatus according to an embodiment of the present disclosure.

Now reference is made to FIG. 14 illustrating a simplified block diagram of an apparatus 1400 that may be embodied in/as an access node (e.g., the access node 101 shown in FIG. 1), or a localization server (e.g., the localization server 103 shown in FIG. 1).

The apparatus 1400 may comprise at least one processor 1401, such as a data processor (DP) and at least one memory (MEM) 1402 coupled to the at least one processor 1401. The apparatus 1400 may further comprise one or more transmitters TX, one or more receivers RX 1403, or one or more transceivers coupled to the one or more processors 1401 relating, for example, to the wireless local communication network technologies, such as WLAN, UWB, Bluetooth®, and wireless telecommunication technologies, such as 2/3/4/5/6G (Generation), or any combinations thereof. Further the apparatus 1400 may have one or more wireline communication means that connects the apparatus to a computer cloud network or system, such as the network 110. The MEM 1402 stores a program (PROG) 1404. The PROG 1404 may include instructions that, when executed on the associated processor 1401, enable the apparatus 1400 to operate in accordance with the embodiments of the present disclosure, for example to perform one of the methods 300 and 400. A combination of the at least one processor 1401 and the at least one MEM 1402 may form processing circuitry or means 1405 adapted to implement various embodiments of the present disclosure.

Various embodiments of the present disclosure may be implemented by computer program executable by one or more of the processors 1401, software, firmware, hardware or in a combination thereof.

The MEMS 1402 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1401 may be of any type suitable to the local technical environment, and may include one or more of general purpose computers, special purpose computers, microprocessors, digital signal processors DSPs and processors based on multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium, for example, non-transitory computer readable medium, such as a hard disk, optical disk, removable storage media, solid state memory, RAM, etc. As will be appreciated by one of skills in the art, the function of the program modules may be combined or distributed as desired in various embodiments. In addition, the function may be embodied in whole or in part in firmware or hardware equivalents such as integrated circuits, field programmable gate arrays (FPGA), and the like.

As used in this application, the term "circuitry" may refer to one or more or all of the following:
  (a) hardware-only circuit implementations (such as implementations in only analog and/or digital circuitry) and (b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all uses of this term in this application, including in any claims. As a further example, as used in this application, the term "circuitry" also covers an implementation of merely a hardware circuit or processor (or multiple processors) or portion of a hardware circuit or processor and its (or their) accompanying software and/or firmware. The term "circuitry" also covers, for example and if applicable to the particular claim element, a baseband integrated circuit or processor integrated circuit for a mobile device or a similar integrated circuit in server, a cellular network device, or other computing or network device.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

The invention claimed is:

1. A method performed at a localization server, comprising:
   determining weights of at least two access points, wherein a weight of an access point is associated with a detectability of the access point for localization of a target device;
   constructing respective weighted kernel functions for each of the at least two access points;
   computing for each of the at least two access points, an inner product of the weight of the respective access point with a weighted kernel function constructed for the respective access point;
   constructing an estimation error function by using inner product for the at least two access points;
   determining weight parameters of the respective weighted kernel functions, to optimize the estimation error function with a constrain condition of L1 regularization; and
   selecting one or more access points to be used for position estimation of the target device from the at least two access points, according to the determined weight parameters.

2. The method as claimed in claim 1, wherein determining the weights of the at least two access points further comprises:
   receiving the weights from respective access points of the at least two access points.

3. The method as claimed in claim 1, wherein the selecting further comprises:
   if the determined weight parameter of the weighted kernel function constructed for an access point is non-zero, determining that the access point is to be used for the position estimation.

4. The method as claimed in claim 1, wherein optimization to the estimation error function is further constrained by a distance range of possible movement of the target device.

5. The method as claimed in claim 1, further comprising:
   receiving channel state information of a radio link between the target device and a particular access point of the at least two access points; and
   utilizing the received channel state information for estimating the position for the target device.

6. The method as claimed in claim 3, further comprising:
   determining, a detectability of the particular access point for localization of the target device, based on the channel state information; and
   determining whether the particular access point is to be used for position estimation of the target device or not based on the determined detectability.

7. The method as claimed in claim 5, wherein determining whether the particular access point is to be used for position estimation of the target device or not comprises:
   determining that the particular access point is not to be used for position estimation of the target device, if the detectability is lower than a predetermined threshold.

8. The method as claimed in claim 5, further comprising:
   receiving information on an adjustment to the radio link between the target device and the particular access point,
   and wherein the determining of the detectability of the particular access point is further based on the adjustment.

9. The method as claimed in claim 5, further comprising:
   determining a weight for the particular access point based on the determined detectability.

10. An apparatus at a localization server, comprising:
    at least one processor; and
    at least one memory including computer program code, the memory and the computer program code configured to, with the processor, cause the apparatus at least to,
    determine weights of at least two access points, where a weight of an access point is associated with a detectability of the access point for localizing a target device;
    construct respective weighted kernel functions for each of the at least two access points;
    compute for each of the at least two access points, an inner product of the weight of the respective access point with a weighted kernel function constructed for the respective access point;
    construct an estimation error function by using inner product for the at least two access points;
    determine weight parameters of the respective weighted kernel functions, to optimize the estimation error function with a constrain condition of L1 regularization; and
    select one or more access points to be used for position estimation of the target device from the at least two access points, according to the determined weight parameters.

11. The apparatus as claimed in claim 10, wherein the memory and the computer program code is configured to, with the processor, further cause the apparatus to:
    receive the weights from respective access points of at least two access points.

12. The apparatus as claimed in claim 10, wherein the memory and the computer program code is configured to, with the processor, further cause the apparatus to,
    if the determined weight parameters of the weighted kernel function constructed for an access point is non-zero, determine that the access point is to be used for the position estimation.

13. The apparatus as claimed in claim 10, wherein the memory and the computer program code is configured to, with the processor, further cause the apparatus to,
    receive channel state information of a radio link between the target device and an particular access point of the at least two access points.

14. The apparatus as claimed in claim 10, wherein the memory and the computer program code is configured to, with the processor, further cause the apparatus to,
    determine, a detectability of the particular access point for localization for the target device, based on the channel state information; and
    determine whether the particular access point is to be used for the position estimation of the target device or not based on the determined detectability.

15. The apparatus as claimed in claim 14, wherein the memory and the computer program code is configured to, with the processor, further cause the apparatus to,
    determine a weight for the particular access point based on the determined detectability.

* * * * *